(12) United States Patent
Pauls

(10) Patent No.: US 9,554,051 B2
(45) Date of Patent: Jan. 24, 2017

(54) DISPLAY ASSEMBLY

(71) Applicant: Linda Pauls, Ravenel, SC (US)

(72) Inventor: Linda Pauls, Ravenel, SC (US)

( * ) Notice: Subject to any disclaimer, the term of this patent is extended or adjusted under 35 U.S.C. 154(b) by 57 days.

(21) Appl. No.: 14/627,084

(22) Filed: Feb. 20, 2015

(65) Prior Publication Data

US 2016/0248981 A1 Aug. 25, 2016

(51) Int. Cl.
*H04N 5/64* (2006.01)
*H04N 5/232* (2006.01)
*H04N 5/225* (2006.01)

(52) U.S. Cl.
CPC ........ *H04N 5/23293* (2013.01); *H04N 5/2257* (2013.01); *H04N 5/23203* (2013.01)

(58) Field of Classification Search
CPC .............. H04N 5/23293; H04N 5/2252; H04N 5/23203; H04N 7/181; H04N 5/64; A47F 10/00; A47F 11/04; A47F 2007/195
See application file for complete search history.

(56) References Cited

U.S. PATENT DOCUMENTS

| | | | |
|---|---|---|---|
| D312,898 S | 12/1990 | Roberts | |
| 7,663,645 B1 * | 2/2010 | Okamoto | G06F 3/147 345/619 |
| 7,978,246 B2 | 7/2011 | Osann, Jr. et al. | |
| 8,508,472 B1 * | 8/2013 | Wieder | G06F 3/0304 345/156 |
| 2007/0040033 A1 | 2/2007 | Rosenberg | |
| 2007/0273675 A1 * | 11/2007 | Wangler | G03B 15/12 345/204 |
| 2008/0225123 A1 * | 9/2008 | Osann | A47F 10/00 348/207.11 |
| 2012/0229616 A1 * | 9/2012 | Koike | H04N 7/181 348/77 |
| 2013/0033591 A1 | 2/2013 | Kahashi et al. | |

FOREIGN PATENT DOCUMENTS

WO WO2012110828 8/2012

* cited by examiner

*Primary Examiner* — Lun-Yi Lao
*Assistant Examiner* — Jarurat Suteerawongsa

(57) ABSTRACT

A display assembly includes an external electronic device in electrical communication with an external communications network. A housing is provided that has a back side, a front side and peripheral edge extending therebetween. The back side is coupled to a support surface such a user may stand proximate the front side. A viewing unit is coupled to the housing and the viewing unit records an image of a user wearing clothes. The image is viewable by the user thereby facilitating the user to critique the appearance of the clothes is worn. A remote unit is in electrical communication with the viewing unit and the remote unit actuates the viewing unit to record the image.

8 Claims, 6 Drawing Sheets

DISPLAY ASSEMBLY

BACKGROUND OF THE DISCLOSURE

Field of the Disclosure

The disclosure relates to display devices and more particularly pertains to a new display device for allowing a user to record and view images of clothing worn by the user.

SUMMARY OF THE DISCLOSURE

An embodiment of the disclosure meets the needs presented above by generally comprising an external electronic device in electrical communication with an external communications network. A housing is provided that has a back side, a front side and peripheral edge extending therebetween. The back side is coupled to a support surface such a user may stand proximate the front side. A viewing unit is coupled to the housing and the viewing unit records an image of a user wearing clothes. The image is viewable by the user thereby facilitating the user to critique the appearance of the clothes is worn. A remote unit is in electrical communication with the viewing unit and the remote unit actuates the viewing unit to record the image.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
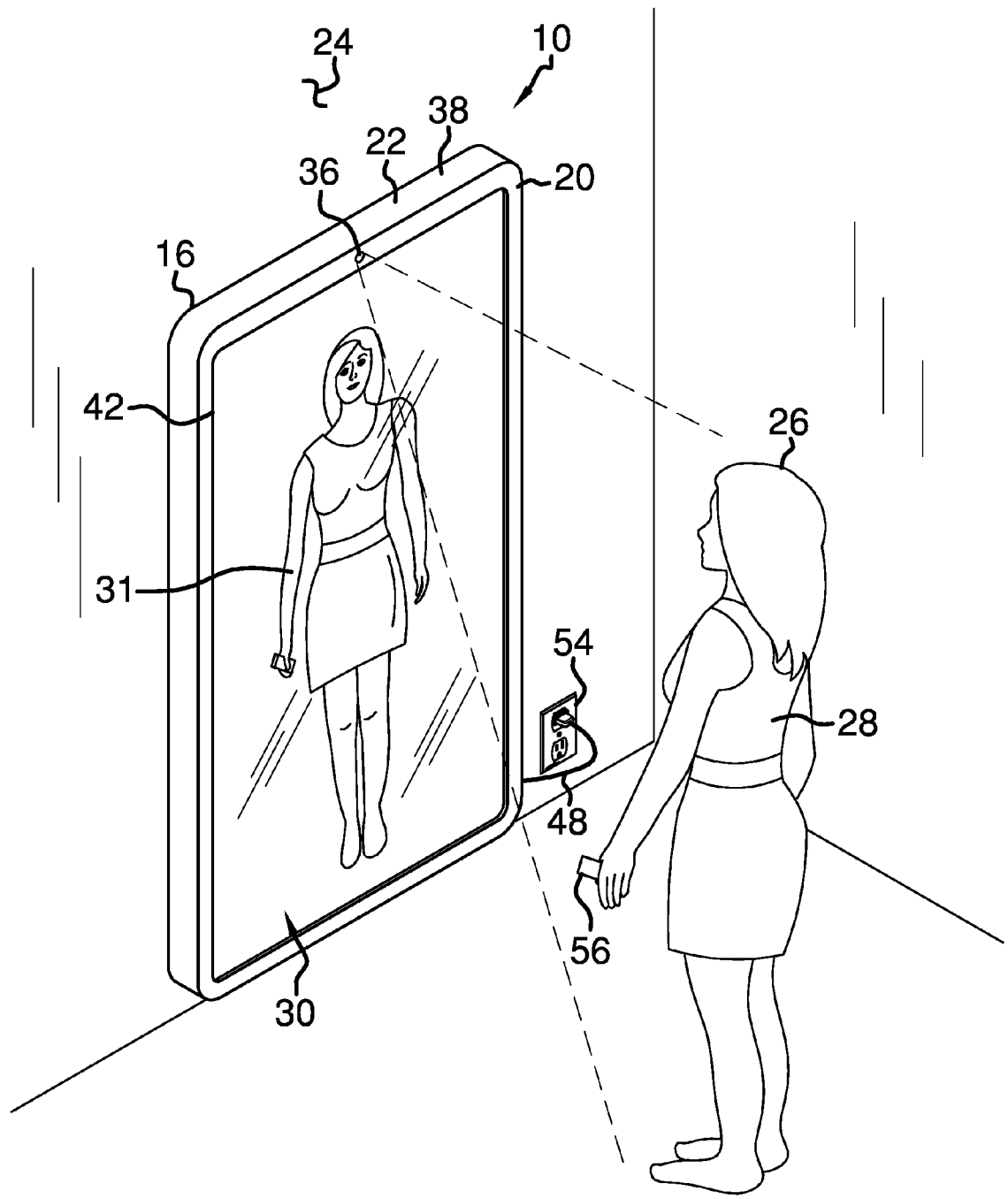
FIG. 1 is a perspective in-use view of a display assembly according to an embodiment of the disclosure.
Figure 2:
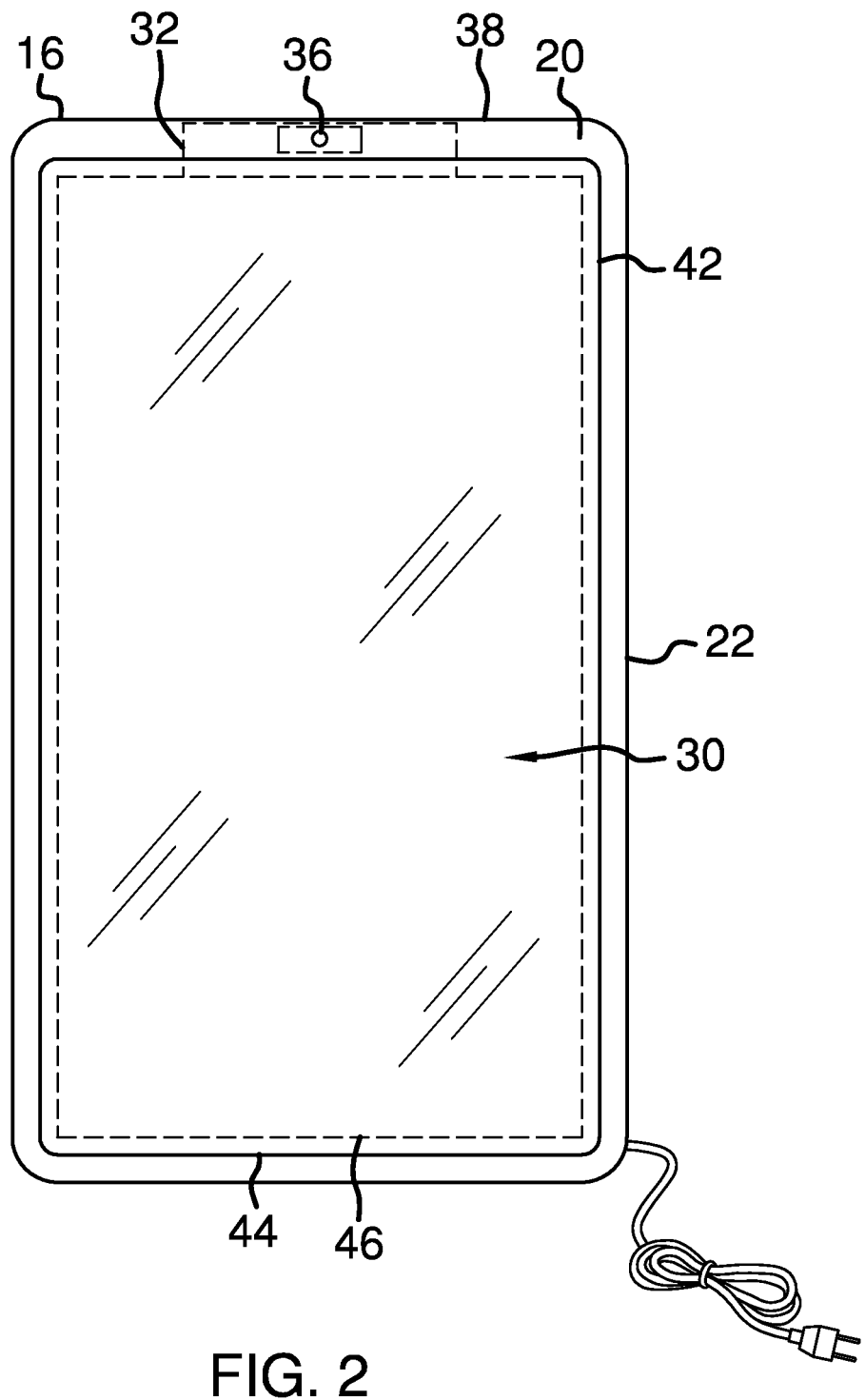
FIG. 2 is a front view of an embodiment of the disclosure.
Figure 3:
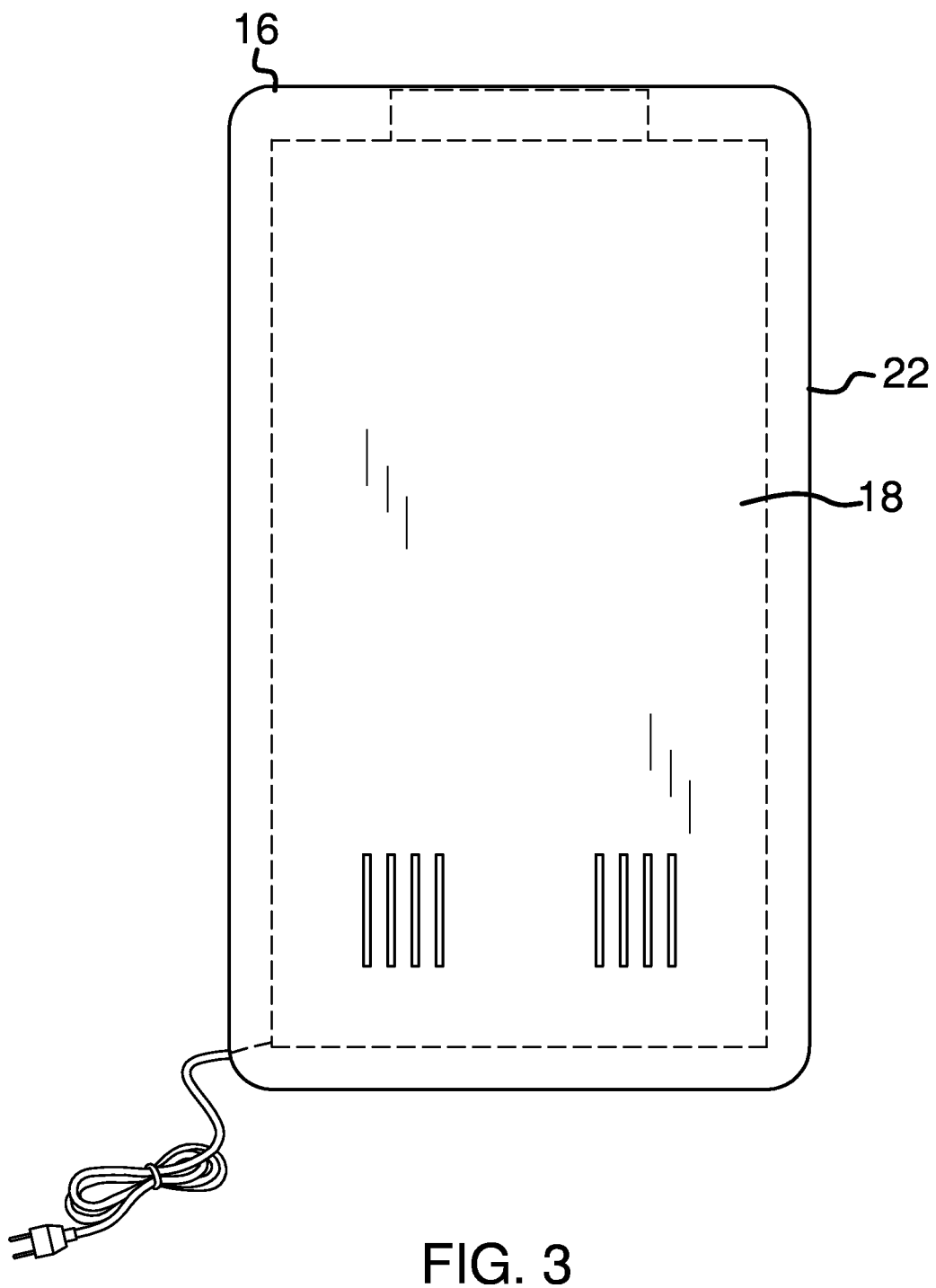
FIG. 3 is a back view of an embodiment of the disclosure.
Figure 4:
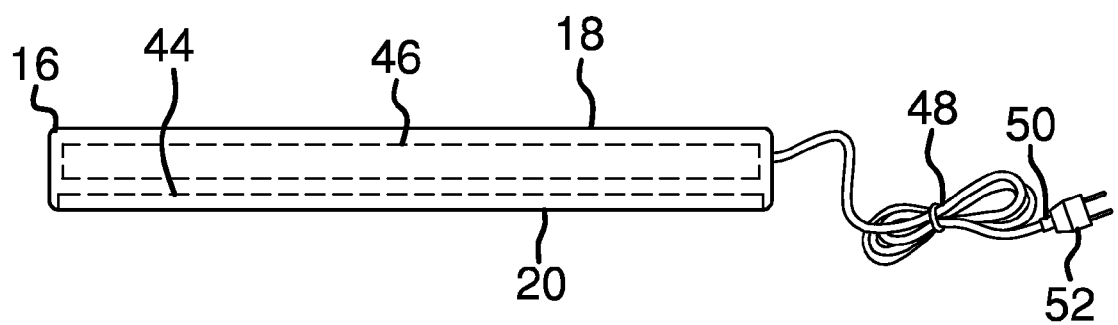
FIG. 4 is a bottom view of an embodiment of the disclosure.
Figure 5:
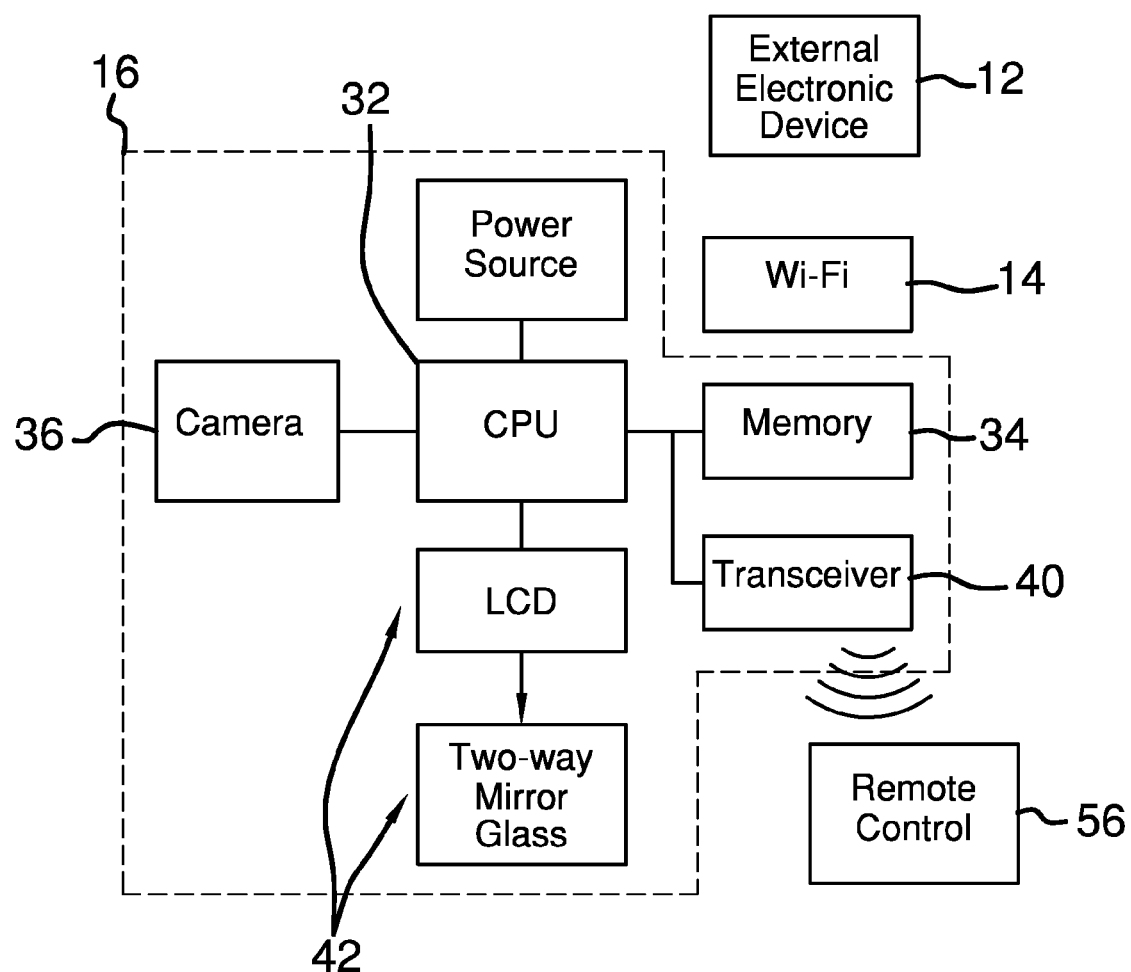
FIG. 5 is a schematic view of an embodiment of the disclosure.
Figure 6:
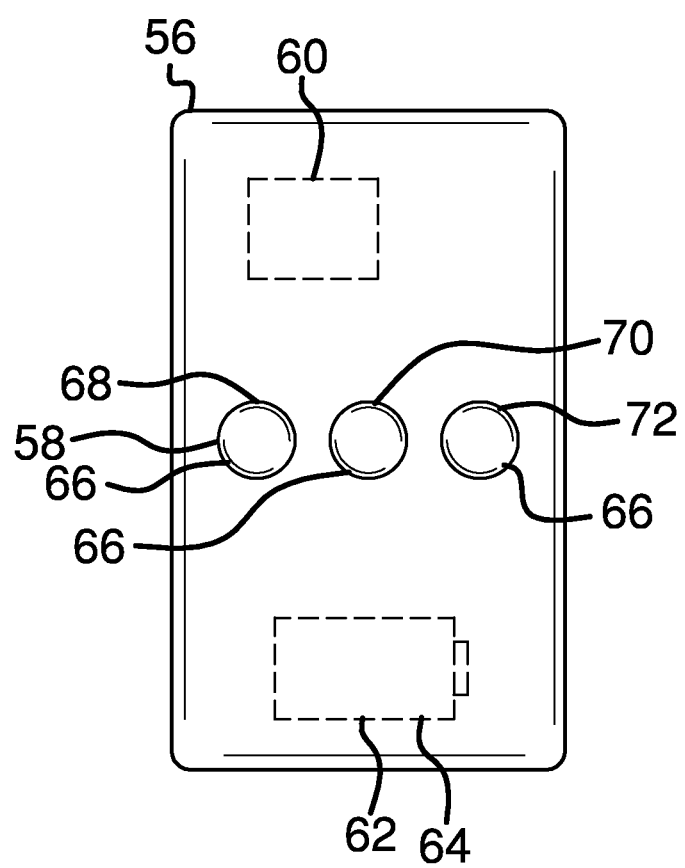
FIG. 6 is a top view of an embodiment of the disclosure.

With reference now to the drawings, and in particular to FIGS. 1 through 6 thereof, a new display device embodying the principles and concepts of an embodiment of the disclosure and generally designated by the reference numeral 10 will be described.

As best illustrated in FIGS. 1 through 6, the display assembly 10 generally comprises an external electronic device 12 that is in electrical communication with an external communications network 14. The external electronic device 12 may comprise a Smartphone, a laptop computer or other electronic device capable of displaying an image. Additionally, the external communications network 14 may comprise a cellular phone network, the internet or other electronic communications network. A housing 16 is provided that has a back side 18, a front side 20 and peripheral edge 22 extending therebetween. The back side 18 is coupled to a support surface 24 such that the front side 20 is positioned to allow a user 26 to stand proximate the front side 20. The support surface 24 may be a wall and the housing 16 may be positioned in an environment involving the user 26 trying on clothes 28.

A viewing unit 30 is coupled to the housing 16 to record an image 31 of the user 26 wearing the clothes 28 such that the image 31 is viewable by the user 26 thereby facilitating the user 26 to critique the appearance of the clothes 28 being worn. The viewing unit 30 comprises a control circuit 32 that is positioned within the housing 16 and an electronic memory 34 that is positioned within the housing 16. The electronic memory 34 is electrically coupled to the control circuit 32. A camera 36 is coupled to the housing 16 and the camera 36 is positioned on the front side 20 such that the camera 36 may record the image 31 of the clothes 28 worn by the user 26. The camera 36 is electrically coupled to the control circuit 32 such that the electronic memory 34 stores the image 31. The peripheral edge 22 of the housing 16 has a top side 38 and the camera 36 is positioned adjacent to the top side 38. The camera 36 may be a digital camera or the like.

A transceiver 40 is positioned within the housing 16 and the transceiver 40 is electrically coupled to the control circuit 32. The transceiver 40 is in electrical communication with the external communications network 14 to facilitate the transceiver 40 transmitting the image 31 to the external communications network 14 such that the image 31 is viewable on the external electronic device 12. The transceiver 40 may comprise a radio frequency transceiver or the like.

A screen 42 is coupled to the front side 20 of the housing 16 and the screen 42 is electrically coupled to the control circuit 32. The screen 42 substantially covers the front side 20 and the screen 42 displays the image 31. The screen 42 comprises a minor 44 to provide a reflection of the clothes 28 worn by the user 26 and the mirror 44 may selectively reflect light or to allow light to pass therethrough. The minor 44 may be a two-way mirror or the like. A display 46 is positioned between the minor 44 and the back side 18 of the housing 16. The display 46 is electrically coupled to the control circuit 32 such that the display 46 may display the image stored in the electronic memory 34. The display 46 may comprise an LED display or the like.

A power cord 48 is electrically coupled to the control circuit 32 and the power cord 48 extends outwardly from the housing 16. The power cord 48 has a distal end 50 with respect to the housing 16 and the distal end 50 has a plug 52 electrically coupled thereto. The plug 52 may be electrically coupled to a power source 54 and the power source 54 may comprise an electrical outlet or the like.

A remote unit 56 is in electrical communication with the viewing unit 30. The remote unit 56 actuates the viewing unit 30 to record the image 31 and the remote unit 56 comprises a remote actuator 58 coupled to the remote unit 56. A transmitter 60 is positioned within the remote unit 56 and the transmitter 60 is electrically coupled to the remote actuator 58. The transmitter 60 is in electrical communication with the transceiver 40 to actuate the camera 36. The transmitter 60 may comprise a radio frequency transmitter or the like. A remote power supply 62 is positioned within the remote unit 56 and the remote power supply 62 is electrically coupled to the remote actuator 58. The remote power supply 62 comprises at least one battery 64.

The remote actuator 58 may be one of plurality of remote actuators 66 comprising a record actuator 68, a transmit actuator 70 and a display actuator 72. The record actuator 68 is engaged to actuate the camera 36 to record the image 31. The transmit actuator 70 is engaged to transmit the image 31 to the transceiver 40 to facilitate the image 31 being viewed on the external electronic device 12 and to facilitate the image 31 being stored in the electronic memory 34. The display actuator 72 is engaged to actuate the display 46 to display the image 31 recorded by the camera 36.

In use, the user 26 wears the clothes 28 and stands proximate the screen 42. The minor 44 provides a reflection of the user 26 wearing the clothes 28. The user 26 actuates the record actuator 68 thereby actuating the camera 36 to record the image 31 of the user 26 wearing the clothes 28. The user 26 may stand at varying angles with respect to the screen 42 in order to get a 360 degree view of the clothes 28 on the user 26. The user 26 actuates the display actuator 72 to view the image 31 on the display 46. The minor 44 ceases reflecting light and allows light from the display 46 to pass through the minor 44 when the display actuator 72 is engaged. The user 26 actuates the transmit actuator 70 to store the image 31 in the electronic memory 34 and to transmit the image 31 to the external electronic device 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A display assembly configured to present a view of articles of clothing being worn from a plurality of angles, said assembly comprising:
    an external electronic device, said external electronic device being configured to be in electrical communication with an external communications network;
    a housing having a back side, a front side and peripheral edge extending therebetween, said back side being coupled to a support surface such that said front side is configured to be positionable such that a user may stand proximate said front side;
    a viewing unit coupled to said housing, said viewing unit being configured to record an image of a user wearing clothes such that the image is viewable by the user thereby facilitating the user to critique the appearance of the clothes being worn;
    a remote unit being in electrical communication with said viewing unit, said remote unit being configure to actuate said viewing unit to record the image;
    a control circuit;
    an electronic memory;
    a screen coupled to said front side, said screen being electrically coupled to said control circuit, said screen substantially covering said front side, said screen being configured to display the image, wherein said screen comprises a mirror being configured to provide a reflection of the clothes worn by the user, said mirror being further configured to selectively reflect light or to allow light to pass therethrough;
    a camera being coupled to said housing, said camera being positioned on said front side such that said camera is configured to record an image of the clothes worn by the user; and
    a display positioned between said mirror and said back side of said housing, said display being electrically coupled to said control circuit such that said display is configured to display the image stored in said electronic memory.

2. The assembly according to claim 1, wherein said electronic memory is electrically coupled to said control circuit.

3. The assembly according to claim 2, further comprising said camera being electrically coupled to said control circuit such that said electronic memory stores the image, said peripheral edge of said housing having a top side, said camera being positioned adjacent to said top side.

4. The assembly according to claim 3, further comprising a transceiver being positioned within said housing, said transceiver being electrically coupled to said control circuit, said transceiver being configured to be in electrical communication with the external communications network to facilitate said transceiver transmitting the image to the external communications network such that the image is viewable on said external electronic device.

5. The assembly according to claim 1, wherein a power cord electrically coupled to said control circuit, said power cord extending outwardly from said housing, said power cord having a distal end with respect to said housing, said distal end having a plug electrically coupled thereto, said plug being configured to be electrically coupled to a power source.

6. The assembly according to claim 1, further comprising:
    a transceiver; and
    said remote unit comprises a remote actuator being coupled to said remote unit, a transmitter positioned within said remote unit, said transmitter being electrically coupled to said remote actuator, said transmitter being in) electrical communication with said transceiver to actuate said camera.

7. The assembly according to claim 6, wherein a remote power supply positioned within said remote unit, said remote power supply being electrically coupled to said remote actuator, said remote power supply comprising at least one battery.

8. A display assembly configured to present a view of articles of clothing being worn from a plurality of angles, said assembly comprising:
    an external electronic device, said external electronic device being configured to be in electrical communication with an external communications network;
    a housing having a back side, a front side and peripheral edge extending therebetween, said back side being coupled to a support surface such that said front side is configured to be positionable such that a user may stand proximate said front side;
a viewing unit coupled to said housing, said viewing unit being configured to record an image of a user wearing clothes such that the image is viewable by the user thereby facilitating the user to critique the appearance of the clothes being worn, said viewing unit comprising:
  a control circuit being positioned within said housing;)
  an electronic memory being positioned within said housing, said electronic memory being electrically coupled to said control circuit;
  a camera being coupled to said housing, said camera being positioned on said front side such that said camera is configured to record an image of the clothes worn by the user, said camera being electrically coupled to said control circuit such that said electronic memory stores the image, said peripheral edge of said housing having a top side, said camera being positioned adjacent to said top side;
  a transceiver being positioned within said housing, said transceiver being electrically coupled to said control circuit, said transceiver being configured to be in electrical communication with the external communications network to facilitate said transceiver transmitting the image to the external communications network such that the image is viewable on said external electronic device;
  a screen coupled to said front side, said screen being electrically coupled to said control circuit, said screen substantially covering said front side, said screen being configured to display the image, said screen comprising:
    a mirror being configured to provide a reflection of the clothes worn by the user, said mirror being further configured to selectively reflect light or to allow light to pass therethrough; and
    a display positioned between said mirror and said back side of said housing, said display being electrically coupled to said control circuit such that said display is configured to display the image stored in said electronic memory; and
  a power cord electrically coupled to said control circuit, said power cord extending outwardly from said housing, said power cord having a distal end with respect to said housing, said distal end having a plug electrically coupled thereto, said plug being configured to be electrically coupled to a power source;
a remote unit being in electrical communication with said viewing unit, said remote unit being configure to actuate said viewing unit to record the image, said remote unit comprising:
  a remote actuator being coupled to said remote unit;
  a transmitter positioned within said remote unit, said transmitter being electrically coupled to said remote actuator, said transmitter being in electrical communication with said transceiver to actuate said camera; and
  a remote power supply positioned within said remote unit, said remote power supply being electrically coupled to said remote actuator, said remote power supply comprising at least one battery.

\* \* \* \* \*